United States Patent
Verschueren (10) Patent No.: US 9,643,864 B2
(45) Date of Patent: May 9, 2017

(54) METHOD AND DEVICE FOR PURIFYING WATER

(75) Inventor: Alwin Verschueren, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 547 days.

(21) Appl. No.: 13/814,275

(22) PCT Filed: Aug. 2, 2011

(86) PCT No.: PCT/IB2011/053295
§ 371 (c)(1),
(2), (4) Date: Feb. 5, 2013

(87) PCT Pub. No.: WO2012/023068
PCT Pub. Date: Feb. 23, 2012

(65) Prior Publication Data
US 2013/0134043 A1    May 30, 2013

(30) Foreign Application Priority Data

Aug. 17, 2010    (EP) .................................... 10172988

(51) Int. Cl.
*C02F 1/469* (2006.01)
*C02F 1/48* (2006.01)
(Continued)

(52) U.S. Cl.
CPC ................ *C02F 1/48* (2013.01); *C02F 1/006* (2013.01); *C02F 1/008* (2013.01); *C02F 1/469* (2013.01);
(Continued)

(58) Field of Classification Search
CPC .. C02F 1/469–1/488; B01F 13/0059–13/0096; B01J 2219/2453
See application file for complete search history.

(56) References Cited

U.S. PATENT DOCUMENTS 3,869,376 A * 3/1975 Tejeda .................. B01D 61/48
204/632
5,425,858 A * 6/1995 Farmer ................ B01J 49/0052
204/164

(Continued)

FOREIGN PATENT DOCUMENTS

JP         5236843 A     3/1977
JP       2009269008 A   11/2009
(Continued)

OTHER PUBLICATIONS

Alwin R.M. Verschueren et al, "Screening and Separation of Charges in Microscale Devices: Complete Planar Solution of the Poisson—Boltzmann Equation", Journal Physical Chemistry B., vol. 112, No. 41, 112, Sep. 19, 2008, pp. 13038-13050.

*Primary Examiner* — James Lin
*Assistant Examiner* — Ho-Sung Chung (57) ABSTRACT

A method and liquid purifying device for controlling concentration of ions in a liquid includes generating a main stream of liquid in a main channel and applying a transverse electric field to the main stream by electrodes that are electrically in direct contact with the liquid flowing in the main channel. Further, a product stream of liquid is derived from a central region of the main stream, and waste streams of liquid are derived from regions of the main stream closer to the electrodes.

16 Claims, 10 Drawing Sheets

(51) Int. Cl.
*C02F 1/00* (2006.01)
*C02F 1/46* (2006.01)
*C02F 5/00* (2006.01)

(52) U.S. Cl.
CPC .............. *C02F 1/4602* (2013.01); *C02F 5/00* (2013.01); *C02F 2209/03* (2013.01); *C02F 2209/09* (2013.01); *C02F 2209/40* (2013.01); *C02F 2301/022* (2013.01)

(56) References Cited

U.S. PATENT DOCUMENTS

| | | | | |
|---|---|---|---|---|
| 5,611,214 | A * | 3/1997 | Wegeng | B01B 1/005 165/185 |
| 5,779,891 | A * | 7/1998 | Andelman | B01D 15/00 204/600 |
| 5,788,826 | A * | 8/1998 | Nyberg | B01J 47/08 204/536 |
| 6,277,265 | B1 * | 8/2001 | Hanak | B41M 1/12 204/242 |
| 6,413,409 | B1 * | 7/2002 | Otowa | C02F 1/008 204/257 |
| 7,833,399 | B2 | 11/2010 | Takagi | |
| 2003/0159999 | A1 | 8/2003 | Oakey et al. | |
| 2003/0190563 | A1 * | 10/2003 | Nagasawa | B01F 5/0453 430/569 |
| 2005/0103634 | A1 * | 5/2005 | Andelman | C02F 1/008 204/630 |
| 2006/0016685 | A1 * | 1/2006 | Hawkins | B01D 61/445 204/296 |
| 2006/0049105 | A1 * | 3/2006 | Max | B01D 57/02 210/650 |
| 2006/0159601 | A1 * | 7/2006 | Yamada | B01F 5/0646 422/198 |
| 2006/0266651 | A1 * | 11/2006 | Iwasaki | B01D 61/48 204/627 |
| 2007/0085227 | A1 * | 4/2007 | Tonkovich | B01D 1/14 261/127 |
| 2007/0246367 | A1 * | 10/2007 | Fan | C02F 1/4691 205/43 |
| 2008/0023333 | A1 * | 1/2008 | Johnson | C02F 1/4691 204/554 |
| 2008/0073215 | A1 * | 3/2008 | Barber | B01D 61/48 204/634 |
| 2008/0108122 | A1 * | 5/2008 | Paul | B01F 5/0475 435/183 |
| 2008/0198531 | A1 | 8/2008 | Shiue et al. | |
| 2008/0267845 | A1 * | 10/2008 | Hoglund | B01F 5/0451 422/224 |
| 2008/0289371 | A1 * | 11/2008 | Hahm | A47L 15/4229 68/17 R |
| 2011/0198225 | A1 * | 8/2011 | Kim et al. | 204/452 |

FOREIGN PATENT DOCUMENTS

| | | |
|---|---|---|
| RU | 2215698 C2 | 11/2003 |
| WO | 03040043 A1 | 5/2003 |
| WO | 2008082696 A2 | 7/2008 |
| WO | 2010011760 A1 | 1/2010 |

* cited by examiner

METHOD AND DEVICE FOR PURIFYING WATER

FIELD OF THE INVENTION

The present invention relates in general to method and device for purifying water, particularly to control the concentration of ions in tap water.

BACKGROUND OF THE INVENTION

Tap water is not chemically pure $H_2O$. Major additional components are calcium bicarbonate and sodium chloride, resulting from groundwater permeation through limestone (calcite) and salty rock layers (halite), respectively. Although these components do not pose a health risk (at least, in normal concentrations: for instance, in the Netherlands, the concentration of calcium bicarbonate may be in the order of 160 ppm and the concentration of sodium chloride may be in the order of 80 ppm), there are disadvantages associated with the presence of said components and therefore it is desirable to be able to control (particularly: reduce) their concentration levels.

Fouling is an issue. Calcium bicarbonate is the prime origin of scale deposits fouling for instance coffee makers, water boilers, steam irons and air humidifiers Minimizing the calcium bicarbonate concentration will delight customers because it avoids the periodic burden of having to clean these devices.

Taste is an issue. Even small quantities of minerals have a large impact on the taste perception. For instance the level of sodium chloride determines the saltiness of the tapwater. The taste of water is an important factor for a consumer to decide whether or not to drink it. Even if the quality of tap water is extraordinary good, people still tend to drink bottled water. Yet, bottled water is relatively expensive as compared to tap water, and its manufacture involves a much higher energy consumption as compared to tap water (in the order of a factor 1000, due to, among others, bottle manufacturing, transport and cooling). It is to be noted that consumers have individual taste preferences, and that there are large regional differences in tapwater content and taste. Therefore, with a view to influencing the taste of tap water so that consumers may switch from bottled water to tap water, it is important to be able to control the mineral level in tap water, and preferably to give the individual consumer a tool so that he can adapt the taste of tap water to his personal preference. It is further desirable that the control process is very effective. For instance, one specific brand of bottled water has a concentration of around 3 ppm of $Na^+$ ions, while the detection threshold of $Na^+$ ions is around 2 ppm: this means that a removal effectiveness of around 95% or higher is desirable.

Techniques for reducing the concentration of minerals in water have already been proposed, operating according to different principles. Generally, these conventional water purification techniques have disadvantages of high power consumption and waste generation.

A first conventional water purification technique to be mentioned here is distillation, which involves first to boil the water to produce vapour (excluding most minerals), and subsequently a cool surface is contacted where the vapour condenses as a liquid again. Although the effectiveness of this process is good (close to 100%), this process requires a lot of energy: it can be shown that the energy consumption is around 600 Wh/L, for compact units where energy recovery is not feasible.

A second conventional water purification technique to be mentioned here is reverse osmosis, which involves the use of high pressure (>10 bar) to force the water through a membrane filter with small pores to exclude the minerals. As compared to distillation, the energy consumption is significantly lower but still high (>4 Wh per liter output), and the effectiveness is typically around 90%. An important disadvantage is that a sizeable waste stream (typically 50% of input) is required in order to avoid clogging of the membrane. In addition, the membrane should be replaced regularly. For descaling applications, the 90% effectiveness of mineral removal is adequate, but for robust taste control a double pass would be required, at the cost of further reduced efficiency (12 Wh/L energy consumption, and 75% waste).

Conceptually both discussed purification techniques focus their energy on the $H_2O$ majority. In contrast, with electric fields it is possible to target the mineral minority efficiently, exploiting the fact that in water these species are ionized. Examples of such techniques are continuous electro de-ionization and capacitive de-ionization.

In continuous electro de-ionization, a stack of parallel streams—separated by ion-selective membranes, and partly filled with ion exchange resins—is electrically converted into purified streams and concentrated waste streams. This purification technology (usually as final clean-up step following reverse osmosis) can create ultrapure water to the highest standards and with excellent efficiency (0.4 Wh/L energy consumption and only 5% waste), but due to the high cost of the membranes and resins it is out of reach for consumer use.

In capacitive de-ionization, an incoming stream is purified by electrically capturing its ions onto two parallel plate electrodes (constructed from porous carbon). This technology is operated in a batch process, alternating between de-ionization and regeneration phases. After the electrodes are saturated with adsorbed ions, in the regeneration phase the electric field is removed and the ions gradually diffuse from the electrodes into the waste stream. Disadvantage of this technology is that the regeneration phase is slow and incomplete. Consequently the waste stream may be high (>20%), and the lifetime of the electrodes will be limited (due to biofouling). An example of this technique is addressed in US-2008/0198531.

WO-2008/082696 discloses an electrical water purification technique indicated as "Microscale Capacitive Deionization". In this technique, a stream of water is subjected to a transverse electric field applied by electrodes arranged along the water channel. Ions are attracted to the charged electrodes, so that the ion concentration in the center of the stream is reduced and the ion concentration in the outer regions of the stream, close to the electrodes, is increased. After some length of channel, the central stream part is separated from the outer stream regions, the central stream providing the output with reduced ion concentration and outer stream regions providing a waste stream with increased concentration. This technique seems very unattractive: according to the information in the publication, very high voltages are needed (in the order of 2.5 to 10 kV), the power consumption is very high (750 W for 50 mL/hr, corresponding to 15 kWh/L), and the ion purification performance is very poor (around 3%).

SUMMARY OF THE INVENTION

An object of the present invention is to provide a water purification method and device in which the above drawbacks are eliminated or at least reduced. Particularly, the present invention aims to provide a water purification method and device that is capable of operating at low energy consumption and high purification performance, with relatively little waste, low cost, and suitable for being installed and used in private consumer households, particularly in under-the-sink applications.

WO-2008/082696 teaches that in the electrical water purification technique indicated as "Microscale Capacitive Deionization" it is essential that non-conductive impermeable barriers are used to separate the electrodes from the fluid. Surprisingly, the present inventor has found that dramatic improvements are obtained if such barriers are omitted and the electrodes are placed in direct contact with the fluid. Experiments have shown that very efficient ion separation is possible with an electrode voltage as low as 2 V and an energy consumption as low as 0.25 Wh/L. Although the precise value of the electrode voltage is not critical, it should preferably be chosen lower than 5 V in order to avoid significant gas formation (caused by electrolysis).

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, in which indications "below/above", "higher/lower", "left/right" etc only relate to the orientation displayed in the drawings, and in which.

DETAILED DESCRIPTION OF THE INVENTION

Figure 1A:
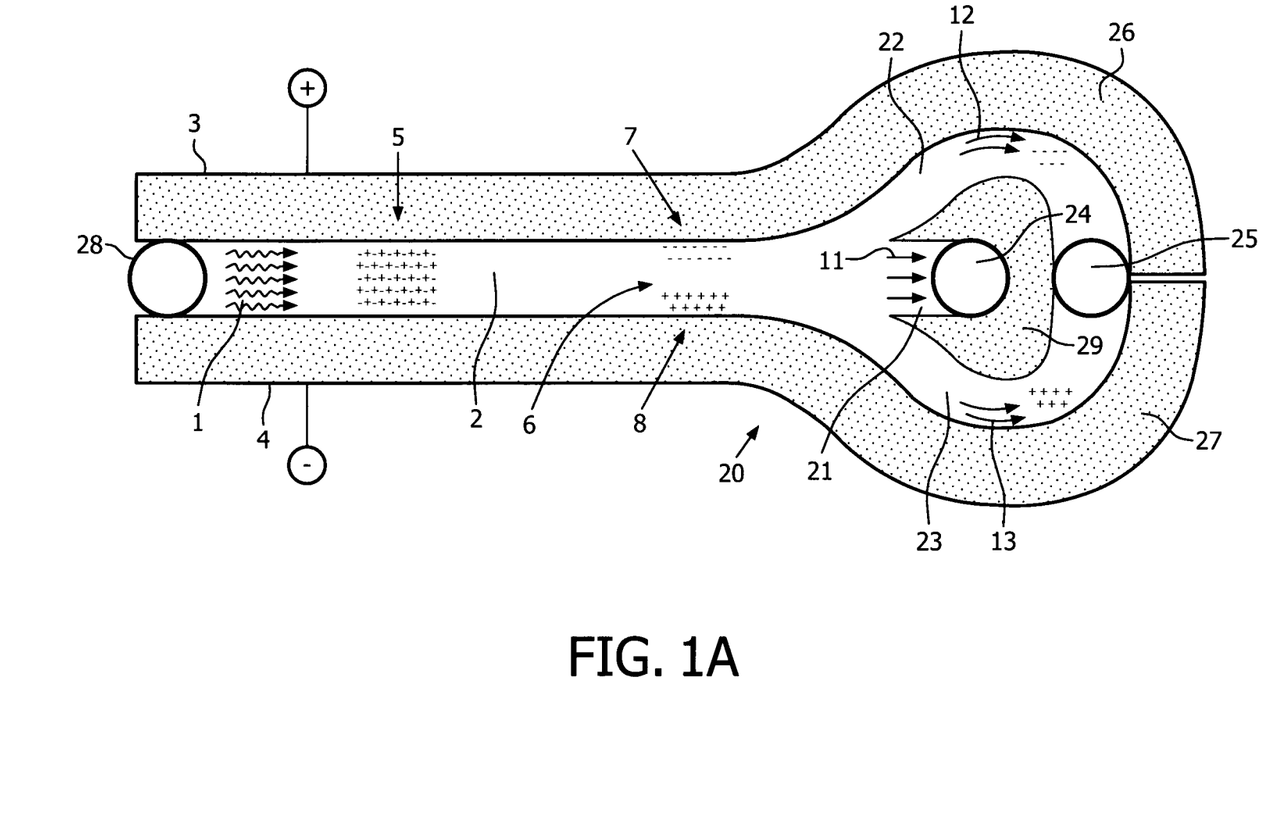
FIG. 1A is a diagram schematically illustrating the principle of operation of the present invention.

FIG. 1A is a diagram schematically illustrating the principle of operation according to one aspect of the present invention. A stream of water 1 is flowing in a main channel 2, from the left to the right in the figure. At least over a certain length of the channel 2, electrodes 3 and 4 are arranged opposite each other and in contact with the water 1. The electrodes 3, 4 may define side walls of the channel 2. In the figure, electrode 3 is shown as having positive voltage with respect to the electrode 4, which is shown as having negative voltage with respect to electrode 3, it being noted that this relates to the relative voltages of the electrodes with respect to each other and not necessarily absolute voltage with respect to earth.

The water 1 contains positive and negative ions, as indicated at 5, substantially distributed evenly in the water. The electrodes 3, 4 generate a transverse electric field, perpendicular to the direction of flow of the water 1, as should be clear to a person skilled in the art. Consequently, positive ions tend to move towards the negative electrode 4 and negative ions tend to move towards the positive electrode 3, as should also be clear to a person skilled in the art. As a result, after some length of channel, the water in a boundary layer close to the positive electrode 3 is richer with negative ions, as indicated by reference numeral 7, while the water in a boundary layer close to the negative electrode 4 is richer with positive ions, as indicated by reference numeral 8. In the central region of the channel 2, the ion concentration has reduced, as indicated by reference numeral 6. It should be noted that the exact values of the ion concentrations, or the depletion efficiency in the central region, will depend on, inter alia, the voltage difference between the electrode, the width of the channel i.e. the distance between the electrodes, the flow velocity of the water, and the length of the channel. In any case, it is now possible to separate the water stream into separate streams, indicated as substreams, with mutually different ion contents. To this end, the channel 2 has a fork having at least two output branches to separate purified liquid and waste liquid. People skilled in the art should understand that this fork could be a trifurcation or a bifurcation, or comprises more than one trifurcation and/or more than one bifurcation. FIG. 1A shows that the channel 2 has a trifurcation 20 having three output branches or subchannels 21, 22, 23, where the water stream 1 is separated into three substreams 11, 12, 13 flowing in said subchannels 21, 22, 23, respectively. The central channel 21 carries a first substream 11 corresponding to the central portion of the original stream 1 and thus having few or no ions. A first outer channel 22 carries a second substream 12 corresponding to the outer portion of the original stream 1 enriched with negative ions. Especially when the conditions are such that the flows are laminar, the entire boundary layer of the main stream will take the outer channel 22, so that virtually no negative ions remain in the central channel 21. Likewise, a second outer channel 23 carries a third substream 13 corresponding to the outer portion of the original stream 1 enriched with positive ions. The central channel 21 is an output channel, its stream 11 being an output stream, leading to product output 24, shown as a conduit perpendicular to the plane of drawing. An input end of the main channel 2 is shown connected to an input 28, shown as a conduit perpendicular to the plane of drawing. The outer channels 22, 23 are waste channels, their respective streams 12, 13 being waste streams, leading to individual waste outputs or, in this example, a common single waste output 25. The ion-rich water stream leaving this waste output 25 has an overall charge zero.

It is preferred that the ion-rich water is in good contact with an electrical conductor. In the channel 2, such conductor is embodied by the electrodes 3, 4, which preferably are made of metal. In the first and second outer channels 22, 23, the ion-rich waste water 12, 13 is also in contact with respective electric conductors 26, 27, having the same potential as the electrodes 3, 4, respectively. The conductors 26, 27 alongside the waste channels 22, 23 may be separate from the ion-separating electrodes 3, 4, may be electrically connected to the ion-separating electrodes 3, 4, and may even be formed integrally with the ion-separating electrodes 3, 4, as shown. In each conductor 3, 4, 26, 27, image charges will be created, typically in the form of electrons or holes inside the conductors, to balance the net charges of the ions in the respective channels. Without such balance, the accumulating ion charges will generate large counter-acting electric fields, blocking the transport of ions and reducing the separation efficiency.

At the trifurcation 20, the output channel 21 is preferably, and as shown, aligned with the input main channel 2. The branches may be mutually perpendicular, so that the layout of the trifurcation 20, together with its input 2, would resemble a cross. However, it is preferred that the waste channels 22, 23 have a longitudinal direction making an angle with the longitudinal direction the input main channel 2 of less than 90°, this angle preferably being in the order of about 30°-60°. The joint from the input main channel 2 to the waste channels 22, 23 preferably has gradually curved sidewalls without angled transitions.

In FIG. 1A, the waste channels 22, 23 are directed away from each other and then bend back towards the common waste output 25. Although it is possible that the waste channels 22, 23 make angled corners, it is preferred that the waste channels 22, 23 make gradual curves.

Since in the embodiment of FIG. 1A, the first and second waste channels 22, 23 join in a common output 25, there is a piece of material 29 encompassed by these waste channels 22, 23 and by the output channel 21. This piece of material may be left of neutral voltage. It is also possible that this piece of material 29 is separated into two pieces (not shown), one piece contacting the "negative" waste channel 22 with the negative ions and the other piece contacting the "positive" waste channel with the positive ions, in which case these pieces may be connected to positive and negative polarity, respectively, just like the electrodes 26, 27, respectively.

Figure 1B:
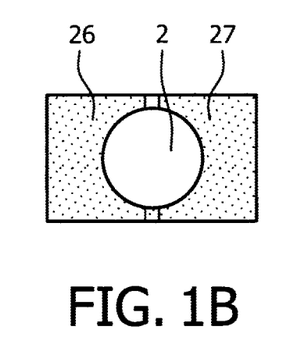
FIGS. 1B and 1C illustrate possible cross sections of a flow channel.
Figure 1C:
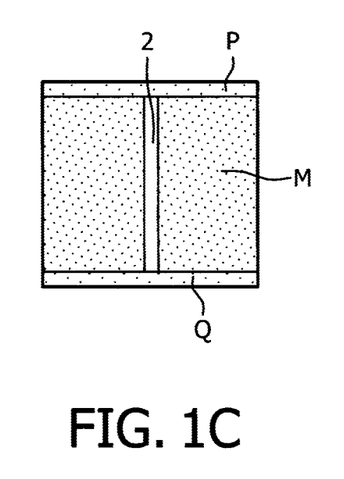
Figure 1D:
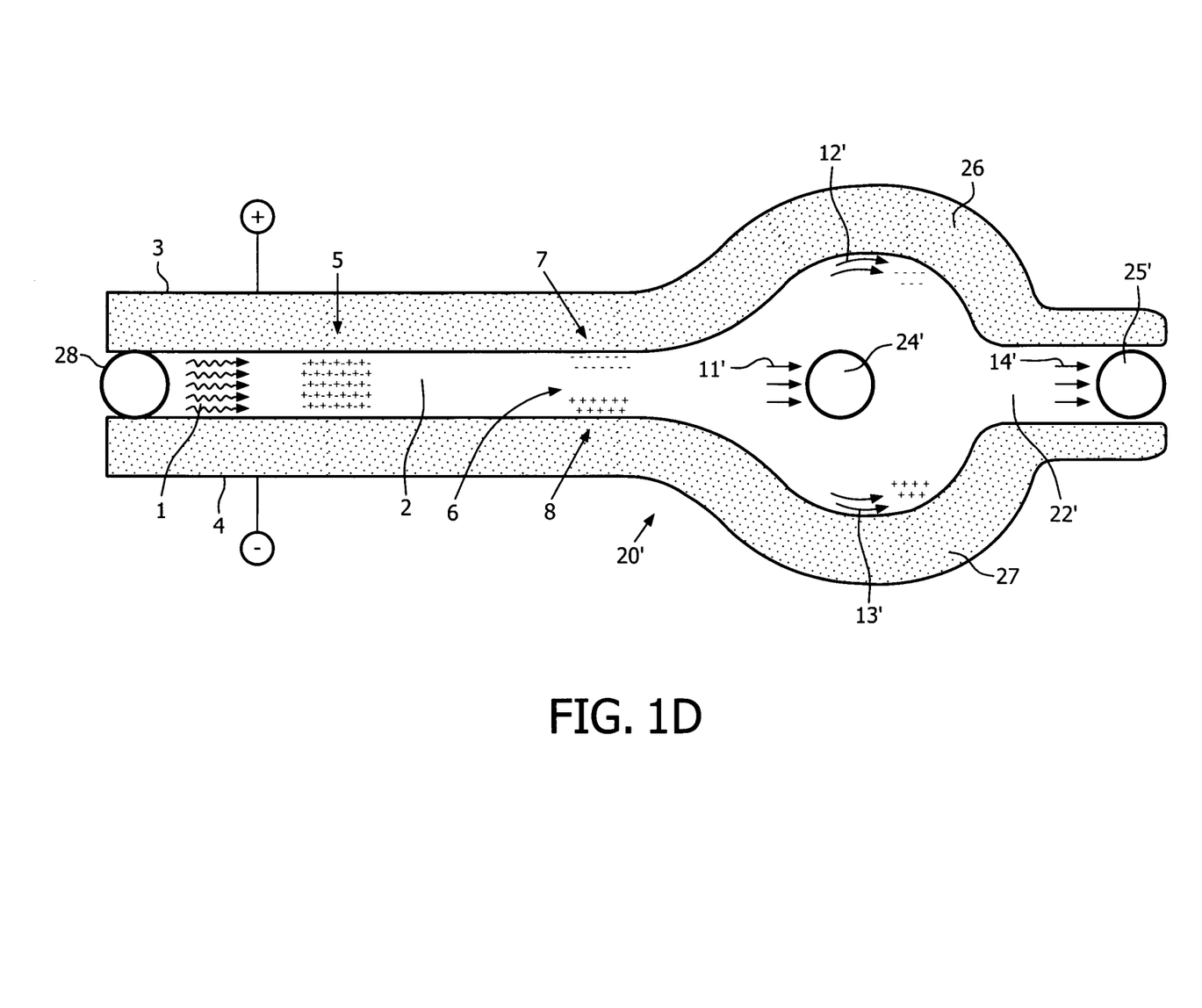
FIG. 1D is a diagram schematically illustrating another alternative embodiment of the present invention.

FIG. 1D shows the schematic diagram of another alternative embodiment of the present invention. In the embodiment of FIG. 1D, the fork in channel 2 has a bifurcation 20', the bifurcation 20' having one central product output 24', for outputting purified liquid 11', and one waste output branch 22', for outputting ion-rich waste liquid 14'. Identical to the embodiment illustrated in FIG. 1A, before entering the bifurcation, the ions contained in the water stream in main channel 2 are substantially separated due to the transverse electric field generated by electrodes 3, 4. A substream 11' corresponding to the central portion of the original stream 1 has few or no ions. The substream 11' flows into central product output 24' of the bifurcation 20', which is the output channel of purified liquid, shown as a conduit perpendicular to the plane of drawing. The remaining liquid from the main stream flows into the waste output branch 22', the other branch of the bifurcation 20', as waste liquid 14'. The remaining liquid leaving this waste output branch by means of waste output 25' has an overall charge zero. Preferably, the product output 24' is positioned in the center of a locally widened channel region. People skilled in the art should understand, that the waste output 25' could also be positioned at other positions of the waste output branch 22' for draining the waste liquid. In the embodiment shown in FIG. 1A, a known disadvantage is that electrostatic potentials can build up in subchannels 22, 23, which could eventually block the flow to the waste exit. The embodiment of FIG. 1D solved this problem by keeping the stream enriched with negative ions and the steam enriched with positive ions together in the same branch, which avoids the generation of electrostatic potentials.

Furthermore, the embodiment of FIG. 1A does not show the cross-sectional shape of the channels. FIG. 1B shows that the channels may have a substantially circular cross-section, but this is difficult to manufacture. FIG. 1C is a schematic cross-section illustratively showing a preferred embodiment in which a thin plate of metal M is used as base material, and the channels 2, 21, 22, 23 are formed by removing a thin line of material, for instance by laser-cutting. FIG. 1A would be a planar top view of such plate, and FIG. 1C would be a cross-section through the plate M, perpendicular to a channel (for instance 2), so that the longitudinal direction of the channel is perpendicular to the plane of drawing. The metal M thus forms side walls of the channel. By sandwiching the plate between plates P and Q of non-conductive material, top and bottom walls of the channel are formed. Although the precise ratio of channel height to channel width is not essential, FIG. 1C illustrates that this ratio is preferably much higher than 1.

In such embodiment, the channel walls themselves also play the role of electrode, and in the following description this design will be assumed, but it should be noted that it is, at least in principle, also possible that the channel is wider and that separate electrodes are mounted within the channel, alongside the channel walls.

Figure 2A:
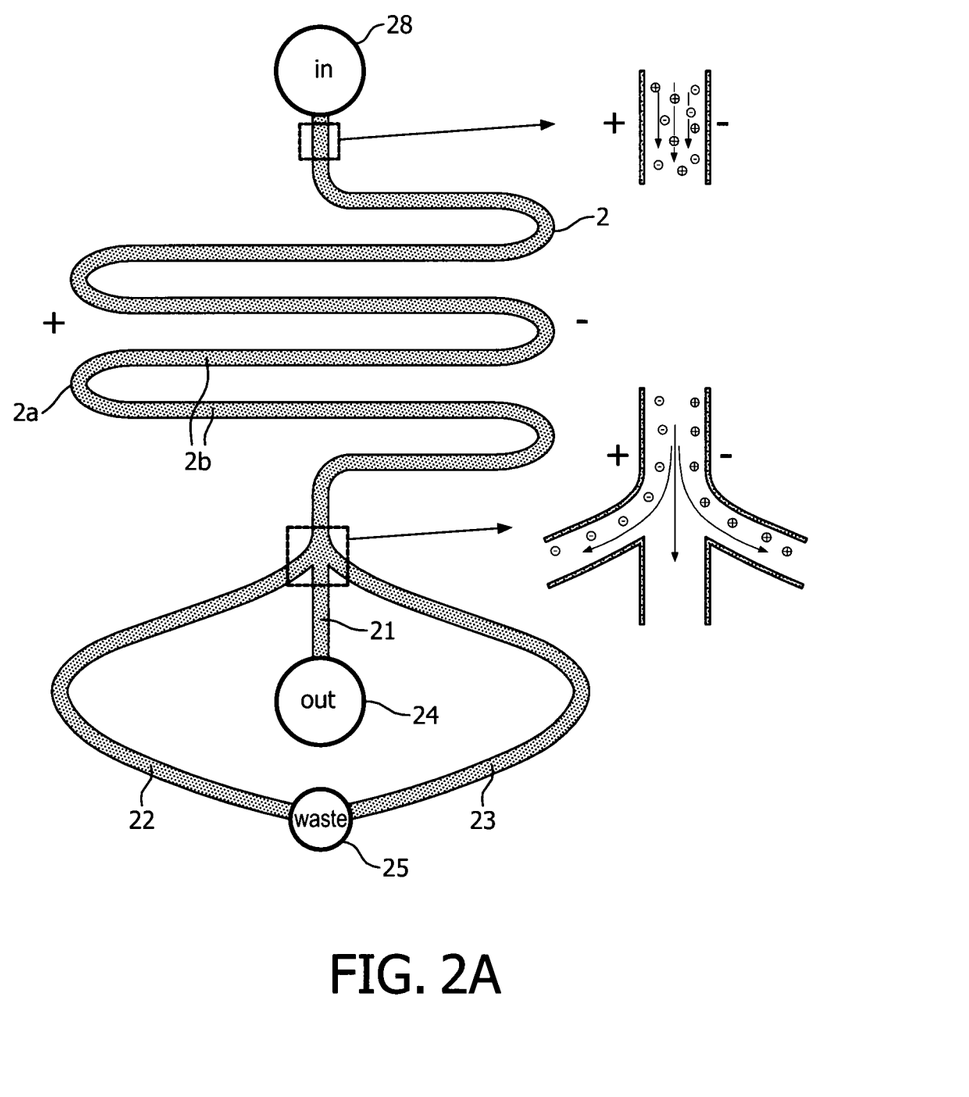
FIG. 2A is a diagram schematically illustrating a preferred aspect of an ion purifying device on a smaller scale.

FIG. 2A is a diagram schematically illustrating an embodiment of the channel 2 on a smaller scale. Reference numeral 28 indicates an input of the channel 2. In order to combine a large channel length with small overall dimensions, the channel 2 is implemented as a meandering channel, with curves 2a of 180° and sequential channel segments 2b that run antiparallel to their neighbors.

Figure 2B:
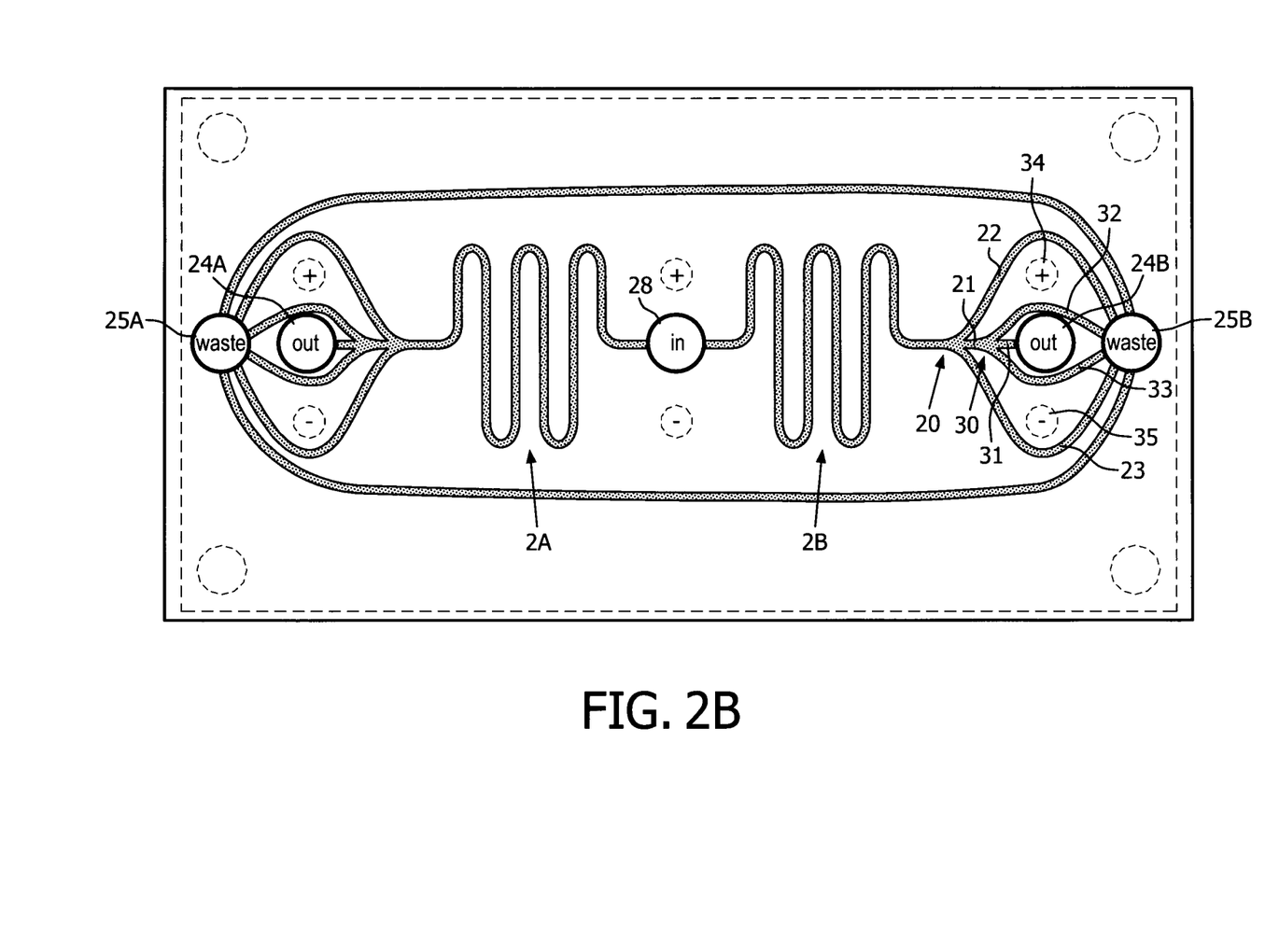
FIG. 2B is a diagram schematically illustrating other favorable features of the invention.

FIG. 2B is a diagram schematically illustrating other favorable features of the invention. The figure shows that it is possible to have multiple channels 2, distinguished from each other by the addition of letter A or B, coupled to one common input 28. The figure further shows that it is possible to have multiple subchannels: downstream from the trifurcation 20, the central branch 21 meets a second trifurcation 30 with basically the same design as the trifurcation 20 of FIG. 1. This second trifurcation 30 has a central output branch 31 aligned with its input 21 and leading to product output 24. The second trifurcation 30 further has first and second waste branches 32, 33 which in this case lead to the same common waste output 25. This applies to each of the channels 2A, 2B, so in this example there are two product outputs 24A, 24B and two waste outputs 25A, 25B. The product outputs 24A, 24B may join each other later, but this is not shown; the same applies to the waste outputs 25A, 25B.

In the embodiment of FIG. 2B, it can be seen that a first material island 34 is defined between the first waste branch 22 of the first trifurcation 20 and the first waste branch 32 of the second trifurcation 30. Likewise, a second material island 35 is defined between the second waste branch 23 of the first trifurcation 20 and the second waste branch 33 of the second trifurcation 30. In principle, one is free to set the potential at these material islands at any desired value. These material islands may be left electrically floating, but it is preferred that the first material island 34 is given the same potential as the material on the opposite side of the first waste branch 22 of the first trifurcation 20 and that the second material island 35 is given the same potential as the material on the opposite side of the second waste branch 23 of the first trifurcation 20, so that the side walls of each of these waste branches 22, 23 always have mutually the same potential. As a result, there is no longer any transverse electrical field in these waste branches 22, 23, so that the ions in these waste branches do not "cling" to the walls any more and can be discharged more easily.

When designing a practical embodiment of a water purifying device, several design considerations play a role, including the following:

It is preferred that the length of the outer subchannels 22, 23, i.e. from their entrance at the point of trifurcation 20 to their exit ends at the common output 25, is as short as possible, such as to prevent as much as possible the build-up of large potentials, which would block the exit waste flow.

The applied potential difference between both ion separation electrodes 3, 4 should preferably be below 2.0 V to minimize electrochemical reactions at the electrodes, and more preferably below 1.2 V in order to avoid electrolysis of the water.

It is preferred that the following equation $$L \cdot \mu \cdot V > v \cdot d^2$$

is fulfilled in order to obtain complete ion separation.

In this equation:
L indicates the length of the main channel 2 up to the trifurcation 20, or at least the length of that part of the channel with the ion separation electrodes 3, 4 alongside,
$\mu$ indicates the lowest mobility of the ions,
V indicates the potential difference between the ion separation electrodes,
v indicates the flow velocity of the water 1,
d indicates the distance between the ion separation electrodes, i.e., the channel width.

It is preferred that the following equation $$1000 \cdot \eta > v \cdot \rho \cdot d$$

is fulfilled in order to have a laminar flow in the channel 2 (notably at its end at the trifurcation).

In this equation:
$\eta$ indicates the viscosity [kg/ms] of the water 1,
v indicates the flow velocity of the water 1,
$\rho$ indicates the density [kg/m³] of the water 1,
d indicates the distance between the ion separation electrodes, i.e., the channel width.

It is preferred that the following equation $$\Delta P < P_0$$

is fulfilled in order to avoid the need of an additional pump.

In this equation:
$\Delta P$ indicates the pressure drop between input and output,
$P_0$ indicates the input pressure, which in the case of a device for use with tap water would be the tap water pressure; typically, this pressure is about 2.5 bar above atmospheric pressure. Assuming that the channel height is much larger than the channel width, $\Delta P$ can be expressed as $$\Delta P = \frac{12 \cdot L \cdot v \cdot \eta}{d^2}$$

In a possible embodiment, all channels have the same width. It is noted that FIG. 1A illustrates the channel width exaggeratedly large; in a practical embodiment, the channel width will perhaps be in a range from 1 μm to 200 μm, although other sizes will be possible. Depending on the production method for the channels, it may be advantageous if all channels have the same width. On the other hand, the widths and lengths of the product and waste subchannels define the flow resistances of the respective subchannels, and these in turn determine the ratio of the flows in these respective subchannels. Thus, a design can be varied in order to accept more waste flow to obtain better purified output flow at a lower flow rate, or vice versa. Particularly, it is possible to have output channels with a width differing from the width of the main channel, and it is possible to have waste output channels with a width differing from the width of the product output channel.

The present invention also provides a relatively easy method, which can be implemented at relatively low cost, for manufacturing a purifying device. This method will be explained with reference to FIG. 3A and further.

Figure 3A:
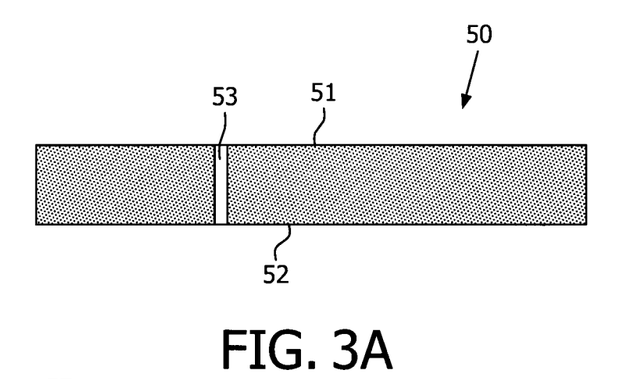
FIGS. 3A-3F illustrate steps in a process of manufacturing a purifying device.

In a first step, a plate 50 of an electrically conductive material is provided, having suitable thickness. A suitable thickness is for instance 1 mm. A suitable material is for instance carbon, graphite, stainless steel, conductive polymer, aluminum, copper. For use in conjunction with tap water, or any other fluid for drinking by humans, stainless steel is preferred.

FIG. 3A is a schematic cross-section of the plate 50. An upper main surface of the plate is indicated by reference numeral 51 and a lower main surface of the plate is indicated by reference numeral 52. In a second step, a cut 53 is made in the plate 50, extending over the entire thickness of the plate 50 from its upper main surface 51 to its lower surface 52. The cut is basically very narrow, in the order of 100 μm or less. The cut is made by machining away the corresponding portions of material. Suitable machining methods are for instance embossing, laser machining, electric discharge machining, etching.

Figure 3B:
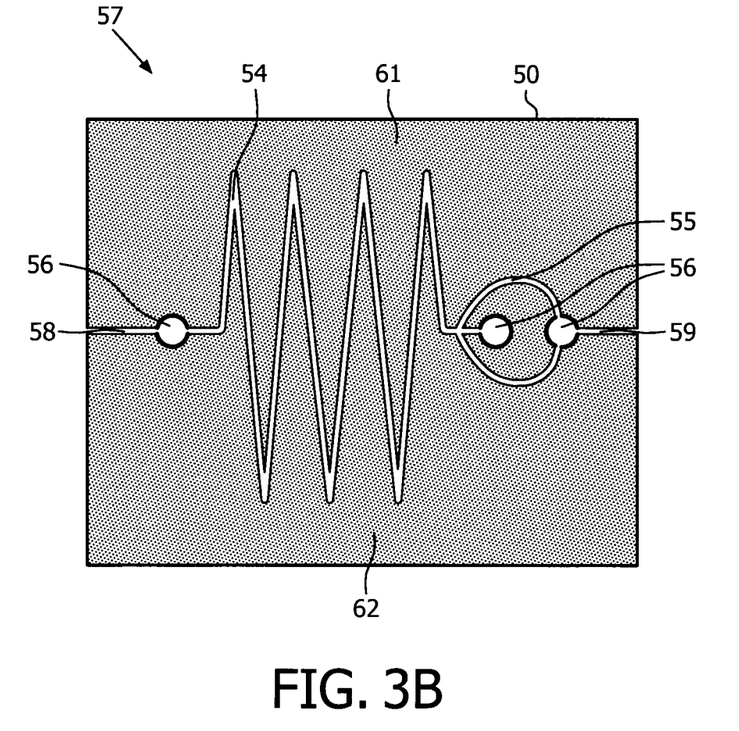

FIG. 3B is a schematic top view of the plate 50, showing that the cut 53 is made to scribe a line in a meandering pattern 54. Likewise, line-shaped cuts 55 are made for the product and waste output subchannels 21, 22, 23, and openings 56 are formed for input 28 and outputs 24, 25. In the following, the plate with such cuts and openings will be indicated as patterned plate 57. It is noted that, alternatively, a patterned plate 57 can be formed constructively by molding in a mold.

Figure 3C:
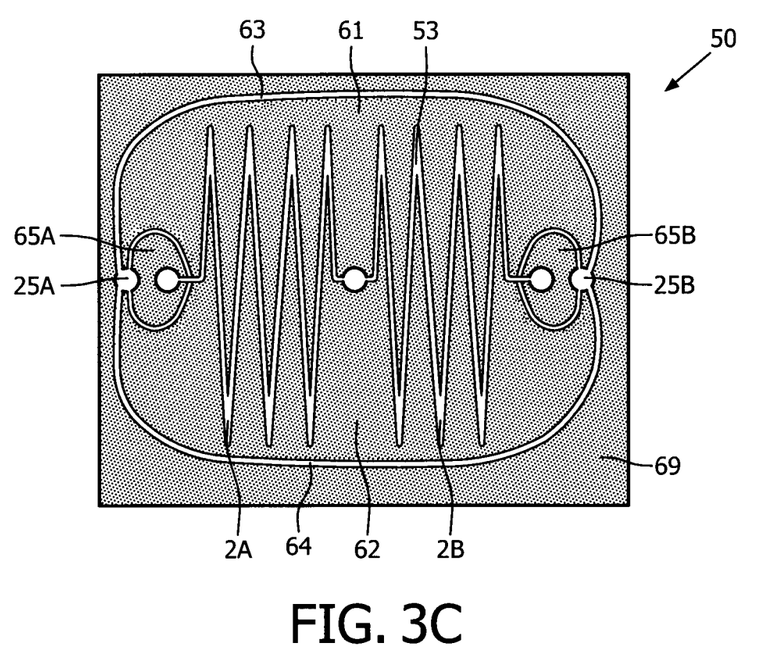

It will be seen that by such cut 53, the plate 51 is basically divided in two or more portions 61, 62. As will be explained in more detail, these portions 61, 62 will act as electrodes carrying different potentials, so it will be needed that these portions 61, 62 are totally separated from each other. In order to do so, additional cuts 58, 59 are needed, extending from input 28 to the edge of the plate and from the waste output 25 to the edge of the plate, respectively. Such cuts would, however, form a leakage path to the edge of the plate which would require additional measures for preventing leakage. Therefore, a design with at least two channels 2A and 2B as schematically illustrated in FIG. 2B is preferred. FIG. 3C is a top view comparable to FIG. 3B, of a plate 50 with a design comparable to FIG. 2B, with the exception of the second trifurcation. Instead of the cuts 58, 59 to the edge of the plate, cuts 63 and 64 extend between the waste outputs 25A and 25B, on opposite sides of the channels 2A, 2B. Now, a first material island 61 can be recognized, completely circumscribed by cuts 53 and 63 and the openings 28, 25A, 25B, and a second material island 62 can be recognized, completely circumscribed by cuts 53 and 64 and the openings 28, 25A, 25B. Thus, these material islands 61, 62 are electrically in non-contact, separated by the channels 2A, 2B, and can be placed at different voltages.

Figure 3D:
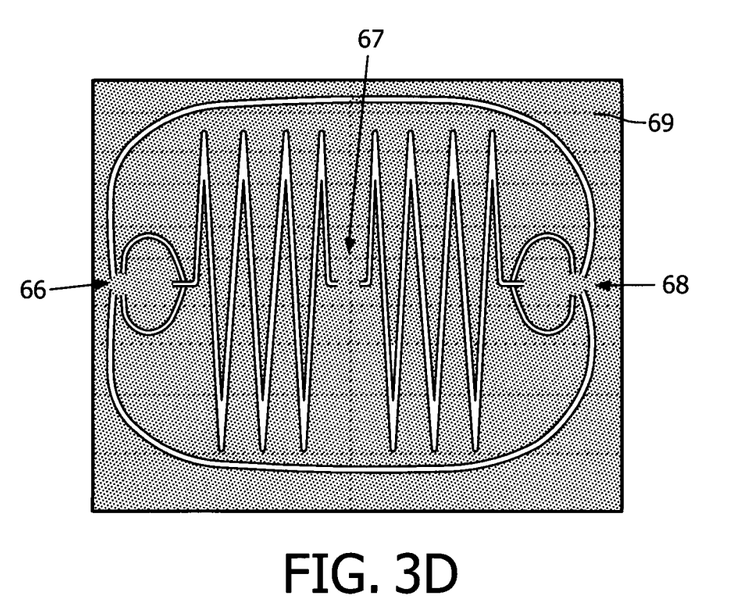

On the other hand, if cuts as shown in FIG. 3C would be made in this stage, the separate portions 61, 62 would fall apart, and it would be very difficult to reposition the plate portions 61, 62 with respect to each other with sufficient accuracy. The same would apply, by the way, for the islands 65A, 65B enclosed by the waste output channel cuts. Therefore, in this stage, the openings for the input 28 and the waste outputs 25A, 25B, are not formed yet. As shown in FIG. 3D, the corresponding channel ends do not meet each other, leaving small bridges 66, 67, 68 connecting the material islands 61, 62 to each other and to the circumferential edge portion 69 of the plate 50, keeping these material islands 61, 62 in place.

Figure 3E:
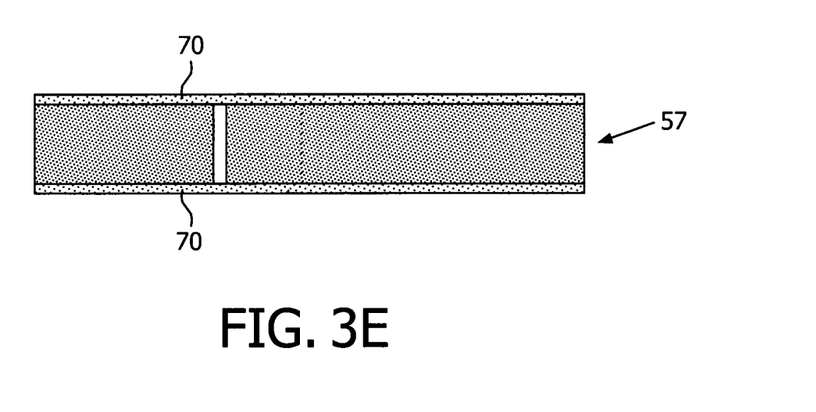

FIG. 3E is a cross-section comparable to FIG. 3A, showing that the patterned plate 57 is subsequently sandwiched between insulating sealing layers 70. These layers 70 are attached to the plate 57, for instance by adhesive, in order to provide liquid-tight sealing and structural integrity, i.e. maintaining the relative positioning of the plate portions 61, 62 on opposite sides of the channels. This will define the main channel 2 and subchannels 21, 22, 23 in that the material of the plate 57 and the material of the insulating sealing layers 70 define side, upper and lower walls, respectively, of the channels 2, 21, 22, 23.

Figure 3F:
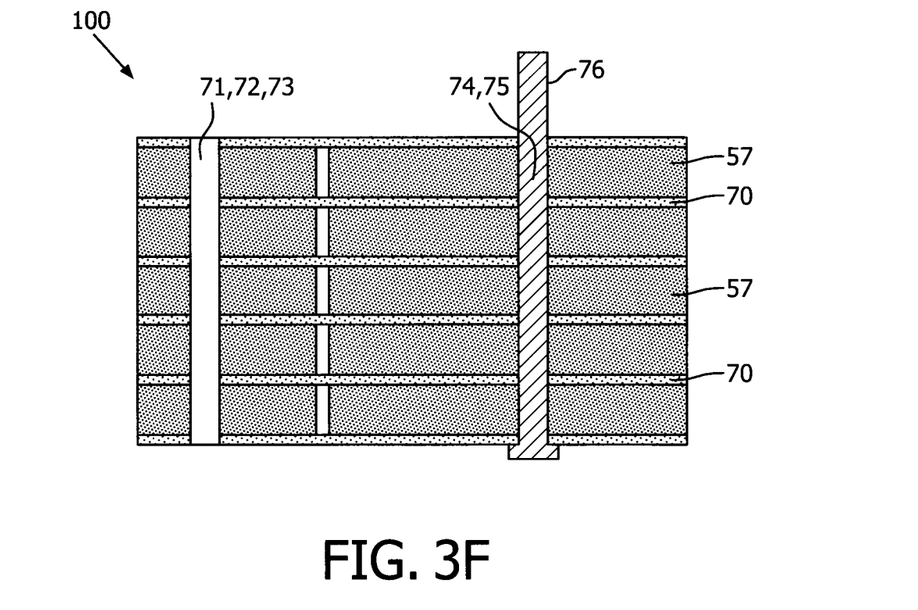

Although one such patterned and sealed plate 57 already embodies the invention, a purifying device 100 preferably comprises a stack of such patterned plates 57, always separated by the insulating sealing layers 70, as illustrated in FIG. 3F. Although the channel patterns in the different plates may differ from each other, preferably the different plates are having mutually identical designs. In any case, they have their respective inputs 28 and outputs 24, 25 aligned. Then, through-holes 71, 72, 73 are machined in the stack, for instance drilled or punched, coinciding with the respective inputs 28 and outputs 24, 25, so that the respective inputs 28 of all plates are interconnected to each other, and the same applies to the respective product outputs 24 and waste outputs 25. Only one such through-hole is shown for sake of convenience. It is noted that machining the through-holes will remove said bridge portions 66, 67, 68, so that the plate portions 61, 62 are now insulated from each other. Terminals are mounted to the stack, communicating with said holes 71, 72, 73, respectively, for connecting external piping or tubing, as will be clear to a person skilled in the art.

Likewise, through-holes 74, 75 are drilled or punched in the stack, coinciding with the plate islands 61, 62, and an electrically conductive pin 76 or the like is placed in each through-hole, electrically contacting the plurality of plates in the stack, for instance by using an electrically conductive adhesive. Said pins define electrical terminals for connecting a suitable electrical supply (not shown)

Figure 4A:
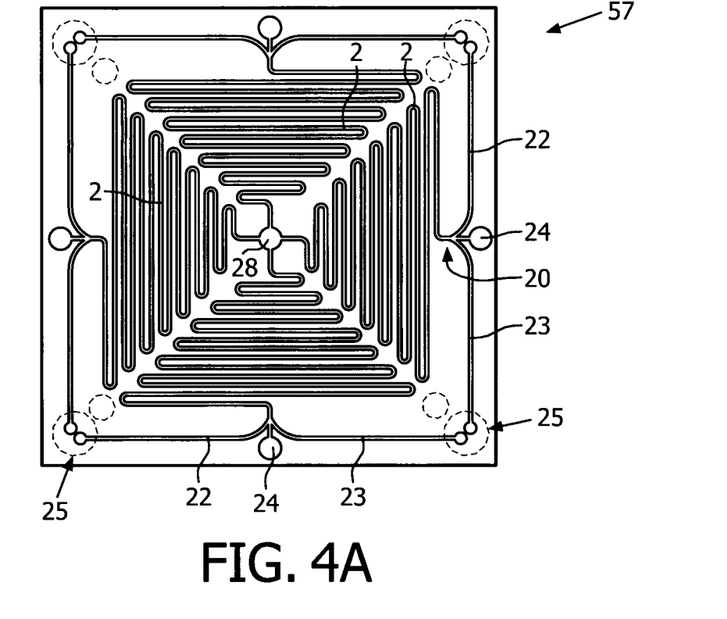
FIGS. 4A, 4B, 5 illustrate exemplary embodiments of patterned plates.

FIG. 4A is a top view of an exemplary embodiment of a patterned plate 57, showing a possible embodiment of a suitable design for the channel pattern. In this embodiment, the plate 57 contains four main channels 2 connected in parallel, having their inputs coupled to a common input 28. The channels 2, 22, 23 are shown in white, the conductive plate material is shown in shading. There are four product outputs 24, always located immediately downstream of a trifurcation 20, so that the length of the four first subchannels 21 is always practically zero. There are also four pairs of waste outputs 25. In this case, the outer channels 22, 23 belonging to one main channel 2 do not meet in a common waste output. Locations for drilling through-holes are indicated by dotted lines. It can be seen that, before assembly, each outer channel terminates in an individual output, while after assembly as a stack and after forming the corresponding through-holes the outer channels 22 of two neighboring main channels 2 meet in one common output, and the same applies to the outer channels 23 of two neighboring main channels 2. When connecting the device 100, all waste outputs will be connected together outside the stack of plates, but this is not shown for sake of simplicity.

Figure 4B:
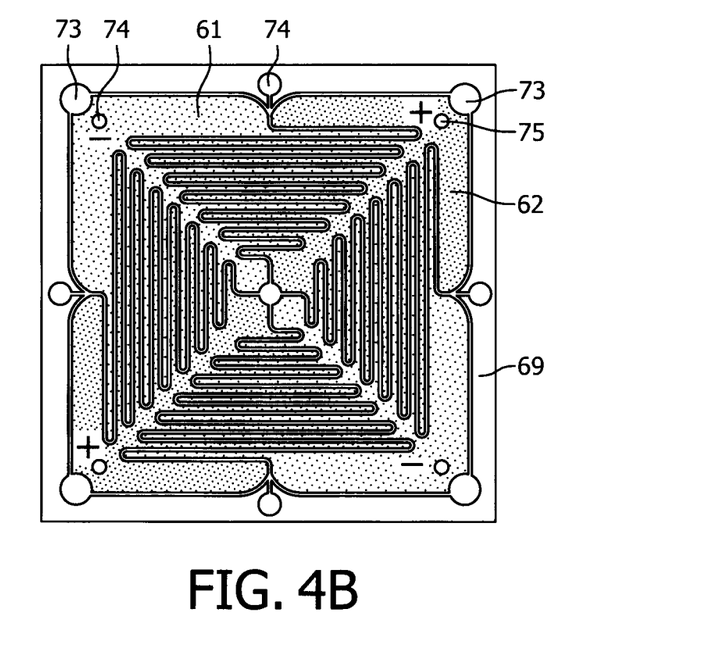

FIG. 4B is a top view comparable to FIG. 4A, showing the through-holes. There are two electrical terminals for connection together to a first potential of the power supply and two electrical terminals for connection together to the other potential of the power supply, always arranged diametrically opposite each other. For sake of clarity, the material portions of opposite polarity are shown in mutually different shadings. It can be seen that, over the entire length of the meandering main channel 2, one side of the flow channel (for instance the left-hand side) is always in contact with material having the first polarity while the opposite side of the flow channel (for instance the right-hand side) is always in contact with material having the second polarity. It can further be seen that the subchannels are always over their full length in contact with material having the same polarity as the channel side from which the subchannel originates.

Figure 5:
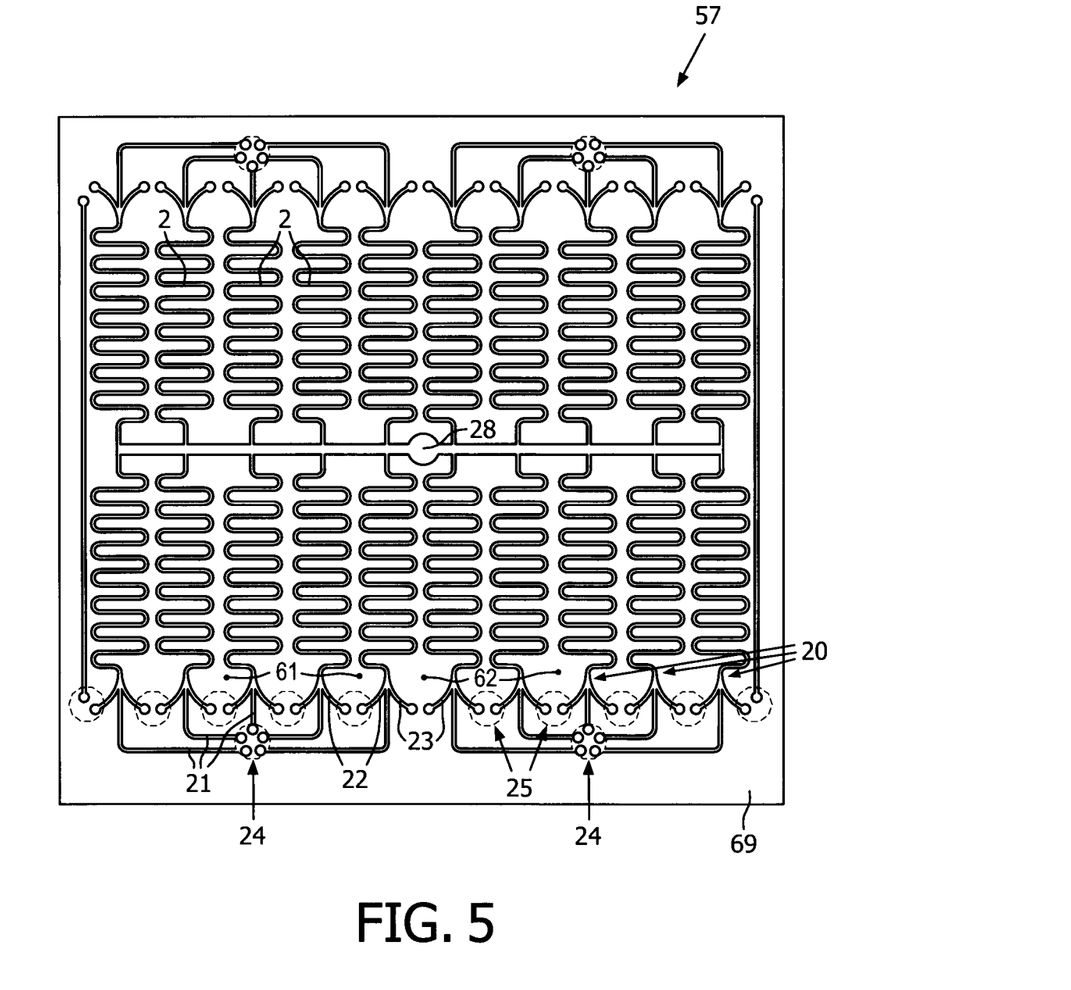

FIG. 5 is a top view of another exemplary embodiment of a patterned plate 57, showing a possible embodiment of a suitable design for the channel pattern, specially designed for use in conjunction with household appliances. In this embodiment, the plate 57 contains twenty main channels 2 connected in parallel, having their inputs coupled to a common input 28. The channels 2, 22, 23 are shown in white, the conductive plate material is shown in shading.

There are four product outputs 24, each receiving five product subchannels 21. There are twenty-two waste outputs 25, of which eighteen are receiving two waste subchannels. Locations for drilling through-holes are indicated by dotted lines. It can be seen that, before assembly, each outer channel terminates in an individual output, while after assembly as a stack and after forming the corresponding through-holes the outer channels 22 of two neighboring main channels 2 meet in one common output, and the same applies to the outer channels 23 of two neighboring main channels 2. When connecting the device 100, all waste outputs will be connected together outside the stack of plates, but this is not shown for sake of simplicity.

The size of the plate is 5 cm×5 cm. A purifying device comprises a stack of four of such plates, so that the device comprises 80 channels in parallel. With a plate thickness of 1 min and a thinness of 1 mm for the insulating separation layers, the overall thickness of the device is about 1 cm.

The width of the channels is 50 m, and the main channels 2 have a length (from input end to trifurcation point) of 25 cm. With an input pressure of 2.5 bar, the flow velocity will be around 25 cm/s. Thus, the retention time of water within the device will be about 1 s. The overall volume of the channels 2 is about 1 Mr. Thus, the capacity of the device is about 3.6 L/hr.

Summarizing, the present invention provides a method for controlling the concentration of ions in a liquid, which method comprises the steps of:

generating a main stream 1 of liquid;
applying a transverse electric field to the main stream by electrodes that are electrically in direct contact with the liquid;
deriving a product stream 11 of liquid from the central region of the main stream, and waste streams 12, 13 of liquid from regions of the main stream closer to said electrodes.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For instance, the present invention can also be used for controlling the concentration of ions in liquids other than water.

Further, it has been mentioned that the purification effectiveness depends on the voltage of the electrodes. Thus, it is possible that the purifying device is provided with a useroperable control for adapting the electrode voltage in order to thus adapt the purification effectiveness and hence the taste of the output water to the user's taste.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A liquid purifying device for controlling a concentration of ions in a liquid, comprising:
   a main channel configured to guide a flow of the liquid to a fork, the liquid entering the main channel from a liquid input;
   the fork leading to a product output configured to output purified liquid;
   a waste output configured to output ion-rich waste liquid; and
   two ion separation electrodes arranged along at least a part of a length of the main channel, the two ion separation electrodes being arranged opposite each other and in direct contact with the liquid flowing in the main channel to generate a transverse electrical field in the liquid, and
   wherein the product output is located in a widened region of the main channel.

2. The liquid purifying device according to claim 1, wherein the fork comprises a bifurcation, the bifurcation having one central product output branch communicating to the product output for outputting the purified liquid, and the bifurcation having a waste output branch for draining the ion-rich waste liquid into the waste output.

3. The liquid purifying device according to claim 1, wherein the flow of the liquid in the main channel is a main stream of liquid, wherein the purified liquid is derived from a product stream of liquid, the product stream being derived from a central region of the main stream, and wherein the ion-rich waste liquid is derived from a waste stream of liquid, the waste stream being derived from regions of the main stream closer to the two ion separation electrodes further from the central region.

4. The liquid purifying device according to claim 1, wherein the liquid flowing in the main channel is in direct contact with both of the two ion separation electrodes arranged opposite each other along the at least part of the length of the main channel such that the two ion separation electrodes directly sandwich the liquid flowing in the main channel.

5. The liquid purifying device according to claim 1, wherein the product output is located in a center of the widened region of the main channel.

6. A liquid purifying device for controlling a concentration of ions in a liquid, comprising: a main channel configured to guide a flow of the liquid to a fork, the liquid entering the main channel from a liquid input and the flow of the liquid in the main channel being a main stream of liquid; the fork leading to a product output configured to output purified liquid, the purified liquid being derived from a product stream of liquid; a waste output configured to output ion-rich waste liquid, the ion-rich waste liquid being derived from a waste stream of liquid; and two ion separation electrodes arranged along at least a part of a length of the main channel, the two ion separation electrodes being arranged opposite each other and in direct contact with the main stream of liquid flowing in the main channel to generate a transverse electrical field in the main stream, wherein conductive portions of both of the two ion separation electrodes directly contain and contact an undivided main stream of liquid flowing in the main channel, and
   wherein the product output is located in a widened region of the main channel.

7. The liquid purifying device according to claim 6, wherein the two ion separation electrodes are arranged along the main channel over an entire length of the main channel,
   wherein a potential difference between said two ion separation electrodes is less than 5 V, and
   wherein the product stream of liquid is derived from a central region of the main stream, and the waste stream of liquid are derived from regions of the main stream closer to the two ion separation electrodes further from the central region.

8. The liquid purifying device according to claim 7, wherein the fork comprises a trifurcation, the trifurcation having one central product output branch communicating to the product output for outputting the purified liquid, and two mutually opposite outer waste output branches communicating to the waste output for outputting the ion-rich waste liquid, and wherein the product output is located in a widened region of the main channel.

9. The liquid purifying device according to claim 8, further comprising two further electrodes, of which one is in direct contact with the ion-rich waste liquid in one of said two mutually opposite outer waste output branches and has a voltage of a same polarity as a voltage of one of said two ion separation electrodes, while the other one of said two further electrodes is in direct contact with the ion-rich waste liquid in the other one of said two mutually opposite outer waste output branches and has a voltage of a same polarity as a voltage of the other one of said two ion separation electrodes.

10. The liquid purifying device according to claim 7, wherein sidewalls of the main channel are electrically conductive and form the conductive portions of said two ion separation electrodes.

11. The liquid purifying device according to claim 7, further comprising:
    a patterned plate formed from an electrically conductive material, the patterned plate being sandwiched between two electrically non-conductive members, and the patterned plate having main surfaces, wherein flow channels are formed as cuts formed in the patterned plate extending over an entire height of said patterned plate from one of the main surfaces to another one of the main surfaces, said flow channels having a substantially rectangular contour, and a width of the flow channels being less than one of 200 μm and 50 μm; and
    electrical terminals connected to respective plate portions of he patterned plate on opposite sides of the main channel for receiving a supply voltage.

12. The liquid purifying device according to claim 8, wherein the one central product output branch of the trifurcation leads to a second trifurcation.

13. The liquid purifying device according to claim 7, further comprising two o ore main channels connected in parallel.

14. The liquid purifying device according to claim 7, further comprising a stack of a plurality of patterned plates, the plurality of patterned plates each being separated from each other by insulating plates, the plurality of patterned plates having input and output holes extending perpendicular through the stack, and having electrical connecting pins extending perpendicular through the stack.

15. The liquid purifying device according to claim 7, wherein the potential difference between said two ion separation electrodes is less than one of 2.0 V and 1.2 V.

16. The liquid purifying device according to claim 11, wherein the electrically conductive material of the patterned plate is stainless steel.

* * * * *